(12) United States Patent
Evans et al.

(10) Patent No.: US 9,330,861 B2
(45) Date of Patent: May 3, 2016

(54) ARC CHUTE ASSEMBLY FOR AN AUTOMATIC TRANSFER SWITCH SYSTEM AND METHODS OF ASSEMBLING THE SAME

(71) Applicant: General Electric Company, Schnectady, NY (US)

(72) Inventors: Arthur Evans, Chicago, IL (US); Jason Harmon, Bristol, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/206,907

(22) Filed: Mar. 12, 2014

(65) Prior Publication Data

US 2014/0268505 A1 Sep. 18, 2014

Related U.S. Application Data

(60) Provisional application No. 61/782,664, filed on Mar. 14, 2013.

(51) Int. Cl.
*H01H 9/46* (2006.01)
*H01H 9/36* (2006.01)
*H02B 1/015* (2006.01)
*H01H 9/34* (2006.01)

(52) U.S. Cl.
CPC . *H01H 9/36* (2013.01); *H01H 9/34* (2013.01); *H01H 9/46* (2013.01); *H02B 1/015* (2013.01); *H01H 2300/018* (2013.01); *Y10T 29/49105* (2015.01)

(58) Field of Classification Search
CPC ....... H01H 33/02; H01H 9/362; H01H 73/18; H01H 9/345; H01H 9/46; H01H 2009/365
USPC .......................................... 218/147, 149, 151
See application file for complete search history.

(56) References Cited

U.S. PATENT DOCUMENTS

| 4,398,097 | A | 8/1983 | Schell et al. |
| 4,804,933 | A | 2/1989 | Becker et al. |
| 4,849,590 | A | 7/1989 | Becker et al. |

(Continued)

FOREIGN PATENT DOCUMENTS

| CN | 201514867 U | 6/2010 |
| CN | 101826403 B | 7/2012 |

(Continued)

OTHER PUBLICATIONS

Wyman, B.W., et al., "A Manually-Operated Spring Mechanism for Medium Voltage Oilless Circuit Breakers," American Institute of Electrical Engineers Transactions, vol. 68, Issue 1, Jul. 1949, pp. 357-363.

(Continued)

*Primary Examiner* — Truc Nguyen
(74) *Attorney, Agent, or Firm* — General Electric Company (57) ABSTRACT

An arc chute assembly for use in an automatic transfer switch includes a housing including a pair of opposing sidewalls and a primary deionization plate coupled between the pair of opposing sidewalls. The primary deionization plate includes a tongue portion oriented substantially midway between the opposing sidewalls and extending toward a contact assembly. The tongue portion is configured to facilitate suppressing an electric arc originating from the contact assembly.

19 Claims, 6 Drawing Sheets

(56) References Cited

U.S. PATENT DOCUMENTS

| | | | |
|---|---|---|---|
| 5,914,467 A | 6/1999 | Jonas et al. | |
| 6,248,970 B1 | 6/2001 | DiMarco et al. | |
| 6,248,971 B1 | 6/2001 | Morel et al. | |
| 6,417,474 B1 * | 7/2002 | Rakus | H01H 9/46 218/148 |
| 6,590,481 B2 | 7/2003 | Turner et al. | |
| 7,034,242 B1 * | 4/2006 | Shea et al. | 218/157 |
| 7,777,600 B2 | 8/2010 | Brooks | |
| 8,222,548 B2 | 7/2012 | Espeut, Jr. | |
| 8,254,089 B2 | 8/2012 | Cosley et al. | |
| 2006/0151437 A1 | 7/2006 | Rakus et al. | |
| 2007/0045235 A1 | 3/2007 | Gerving | |
| 2008/0067153 A1 * | 3/2008 | Pollitt | H01H 9/342 218/154 |
| 2008/0100248 A1 | 5/2008 | Filippenko | |
| 2009/0090698 A1 * | 4/2009 | Shea et al. | 218/147 |
| 2010/0038966 A1 | 2/2010 | Espeut | |
| 2010/0288610 A1 | 11/2010 | Krieger et al. | |
| 2012/0043302 A1 * | 2/2012 | Schaltenbrand | H01H 9/302 218/149 |
| 2012/0242145 A1 | 9/2012 | Espeut | |
| 2013/0049476 A1 | 2/2013 | Lathrop | |
| 2015/0136740 A1 * | 5/2015 | Afshari | H01H 33/08 218/149 |

FOREIGN PATENT DOCUMENTS

| | | |
|---|---|---|
| CN | 103137347 A | 6/2013 |
| EP | 2650893 A1 | 10/2013 |

OTHER PUBLICATIONS

Yu, Li, et al., "Improvement of Reliability of Closing Latch in Spring Type Operating Mechanism of High Voltage Circuit Breakers," Transmission and Distribution Conference and Exposition (T&D), May 2012, pp. 1-4.

PCT Search Report and Written Opinion from PCT Application No. PCT/US2014/025781 dated Jun. 25, 2014.

\* cited by examiner

ARC CHUTE ASSEMBLY FOR AN AUTOMATIC TRANSFER SWITCH SYSTEM AND METHODS OF ASSEMBLING THE SAME

CROSS REFERENCE TO RELATED APPLICATIONS

This application claims priority to and the benefit of the filing date of U.S. Provisional Application No. 61/782,664 filed on Mar. 14, 2013, which is hereby incorporated by reference in its entirety.

BACKGROUND

The embodiments described herein relate generally to electrical switchgear, and, more specifically, to an arc chute assembly for use in an automatic transfer switch (ATS) and methods of assembly thereof.

Transfer switches are used, for example, to quickly connect an emergency power source to a load when a normal power supply fails. For example, facilities such as hospitals, telecom or datacenters, and transportation systems use transfer switches to maintain continuous electrical power when a power failure occurs in the electrical utility service to the facility. When a utility power failure occurs, the transfer switch connects the facility to a backup power generator without significant interruption of electrical power to the facility. A user can either manually or automatically select among multiple sources of backup power to feed the maintained loads. There is a long felt need for mechanically simple and reliable transfer switches which effectively suppress electrical arcs.

Transfer switches and other electrical switching apparatuses typically include a set of stationary electrical contacts and a set of moveable electrical contacts. The stationary and moveable contacts are in physical contact with one another when it is desired that the circuit breaker provide electrical current to a load. However, when it becomes necessary to interrupt the circuit the moveable contacts are moved away from the stationary contacts, thus removing the moveable contacts from physical contact with the stationary contacts and creating a space therebetween. This may result in the formation of an electrical arc beginning at the time the contacts are separated.

In these particular instances, electrical arcs (also known as "arc discharges") are undesirable for a number of reasons. First, they provide a pathway for current to flow through the circuit breaker to a load when it is desired that the load be isolated from such current. Additionally, the electrical arc extending between the contacts often results in vaporization or sublimation of the contact material itself, eventually resulting in destruction or pitting of contacts.

As a result, manufactures of switching gear use arc chute mechanisms to facilitate quenching of this undesirable arc discharge. However, at least some known arc chutes tend to degrade and breakdown dielectrically over time after many arcing events due to degradation of the insulated arc chute housing from the intense heat generated by the arc. As such, what is needed is an arc chute that maintains the integrity of the plastic arc chute housing and prevents contact degradation.

BRIEF DESCRIPTION

In one aspect, an arc chute assembly for use in an automatic transfer switch having a contact assembly is provided. The arc chute assembly includes a housing including a pair of opposing sidewalls and a primary deionization plate coupled between the pair of opposing sidewalls. The primary deionization plate includes a tongue portion oriented substantially midway between the opposing sidewalls and extending toward the contact assembly. The tongue portion is configured to facilitate suppressing an electric arc originating from the contact assembly.

In another aspect, an automatic transfer switch is provided. The automatic transfer switch includes at least one ATS panel including a plurality of contact assemblies and a respective arc chute assembly coupled to each of the plurality of contact assemblies. The arc chute assembly includes a housing comprising a pair of opposing sidewalls and a primary deionization plate coupled between the pair of opposing sidewalls. The primary deionization plate includes a tongue portion oriented substantially midway between the opposing sidewalls and extending toward one of the plurality of contact assemblies. The tongue portion is configured to facilitate suppressing an electric arc originating from the contact assembly.

In yet another aspect, a method of assembling an automatic transfer switch including at least one ATS panel frame is provided. The method includes coupling a plurality of contact assemblies to the ATS panel frame and coupling a respective arc chute assembly to the ATS panel frame proximate each of the plurality of contact assemblies. Coupling the arc chute assembly to the ATS panel frame further includes coupling a housing that includes a pair of opposing sidewalls to the ATS panel frame, and coupling a primary deionization plate between the pair of opposing sidewalls. The primary deionization plate includes a tongue portion oriented substantially midway between the opposing sidewalls and extending toward the contact assembly. The tongue portion is configured to facilitate suppressing an electric arc originating from the contact assembly.

DETAILED DESCRIPTION

One embodiment of the present invention describes an arc chute assembly including a housing and a plurality of laterally-spaced deionization plates coupled within the housing. A primary plate includes a tongue portion that extends toward a contact assembly and is configured to receive an electrical arc. A plurality of secondary plates include a first plate and a second plate that are alternately coupled within housing and that each include a notched portion that combine to define an arc channel configured to mitigate the electrical arc through the arc chute assembly. Opposing sides of the first plate and of the second plate are different lengths such that both a vertical and an axial gap are defined between the first and second plates to prevent the arc from contacting the housing. The embodiments described herein describe an easily serviceable modular design that provides improved arc quenching capability and a longer serviceable life span of the arc chute assembly for interruption of rated current.

Figure 1:
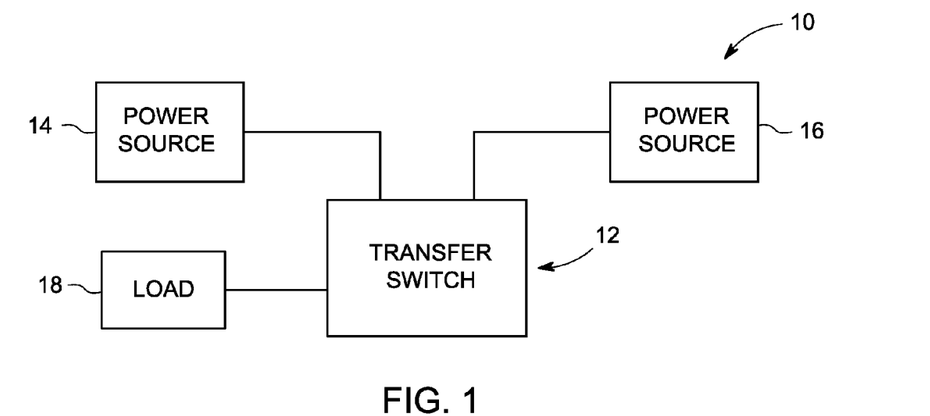
FIG. 1 is a schematic diagram of an exemplary embodiment of an automatic transfer switch system.

FIG. 1 illustrates an exemplary automatic transfer switch system 10 including an automatic transfer switch (ATS) 12. ATS 12 is configured to switch among at least a primary power source 14 and a secondary power source 16 to supply electrical power to a load 18. In the exemplary embodiment load 18 is one of a hospital, airport radar tower or other continuous electrical power user. Generally, load 18 may be any facility that requires a continuous supply of electricity. Load 18, via ATS 12, draws power from primary source 14 under normal operating conditions, wherein primary source 14 is the electrical utility. If, for example, primary power source 14 fails or becomes inadequate to supply load 18, load 18 is transferred via ATS 12 to draw power from secondary source 16, wherein secondary source 16 is a backup energy source, such as a generator. When primary source 14 again provides sufficient power, load 18 is transferred via ATS 12 again from secondary source 16 to draw power from primary source 14. The foregoing description of automatic transfer switch system 10 and ATS 12 operation is exemplary only, and additional functions may be performed by automatic transfer switch system 10.

Figure 2:
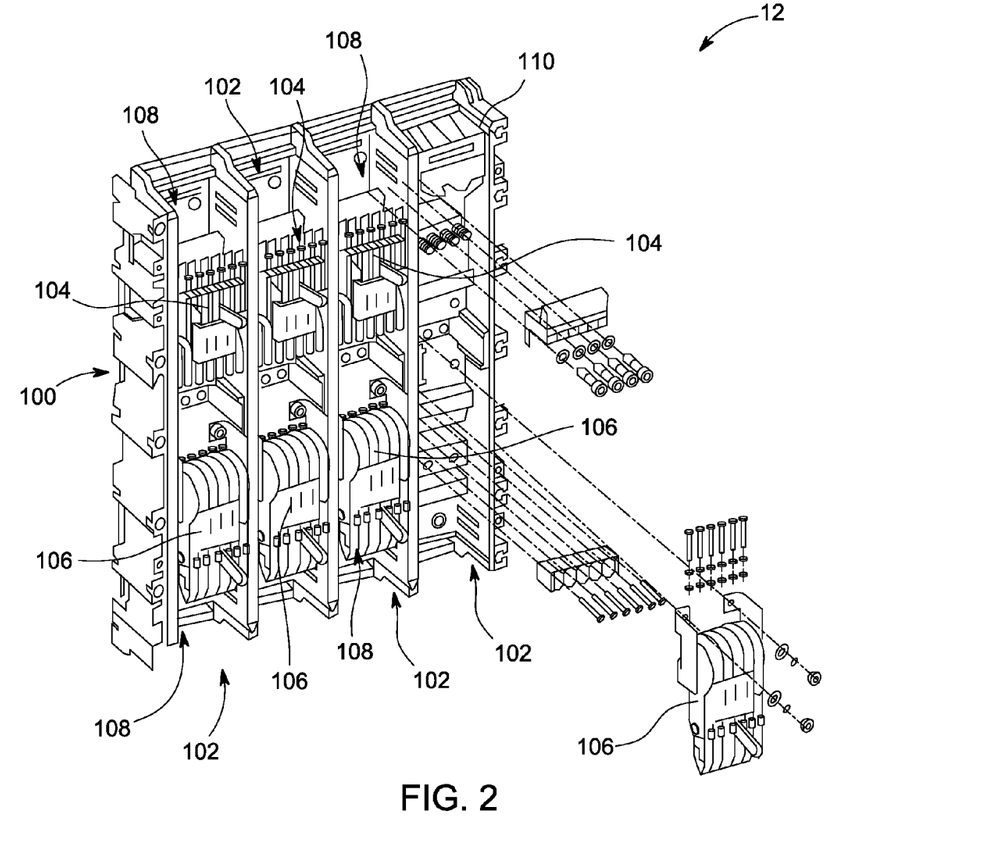
FIG. 2 is an exploded perspective view of an exemplary ATS panel that may be used in the automatic transfer switch system shown in FIG. 1.

FIG. 2 illustrates a partial exploded perspective view of a ATS panel 100 that may be used with ATS 12 of automatic transfer switch system 10 (shown in FIG. 1). ATS panel 100 includes a plurality of contact poles 102. Each pole 102 includes an upper contact assembly 104 and a lower contact assembly 106. Although only four poles 102 are shown in FIG. 2, ATS panel 100 may include as many poles 102 as required to power load 18 (shown in FIG. 1). In the exemplary embodiment, upper contact assemblies 104 are associated with primary power source 14 (shown in FIG. 1) and lower contact assemblies are associated with secondary power source 16 (shown in FIG. 1) such that during normal operation, upper contact assemblies 104 are coupled to load 18 to supply energy and lower contact assemblies 106 are not coupled to load 18. Alternatively, lower contact assemblies 106 may be coupled to primary source 14 to supply energy to load 18. Generally, either contact assemblies 104 or 106 may be coupled to load 18 to facilitate ATS 12 operation as described herein.

In the exemplary embodiment, each pole 102 further includes an arc chute opening 108 defined adjacent to each upper and lower contact assembly 104 and 106. Each opening 108 is configured to receive an exemplary arc chute 110 such that, when inserted, each arc chute 110 is configured to mitigate any electrical arc created as contact assemblies 104 and 106 disengage to transfer power between sources 14 and 16.

Figure 3:
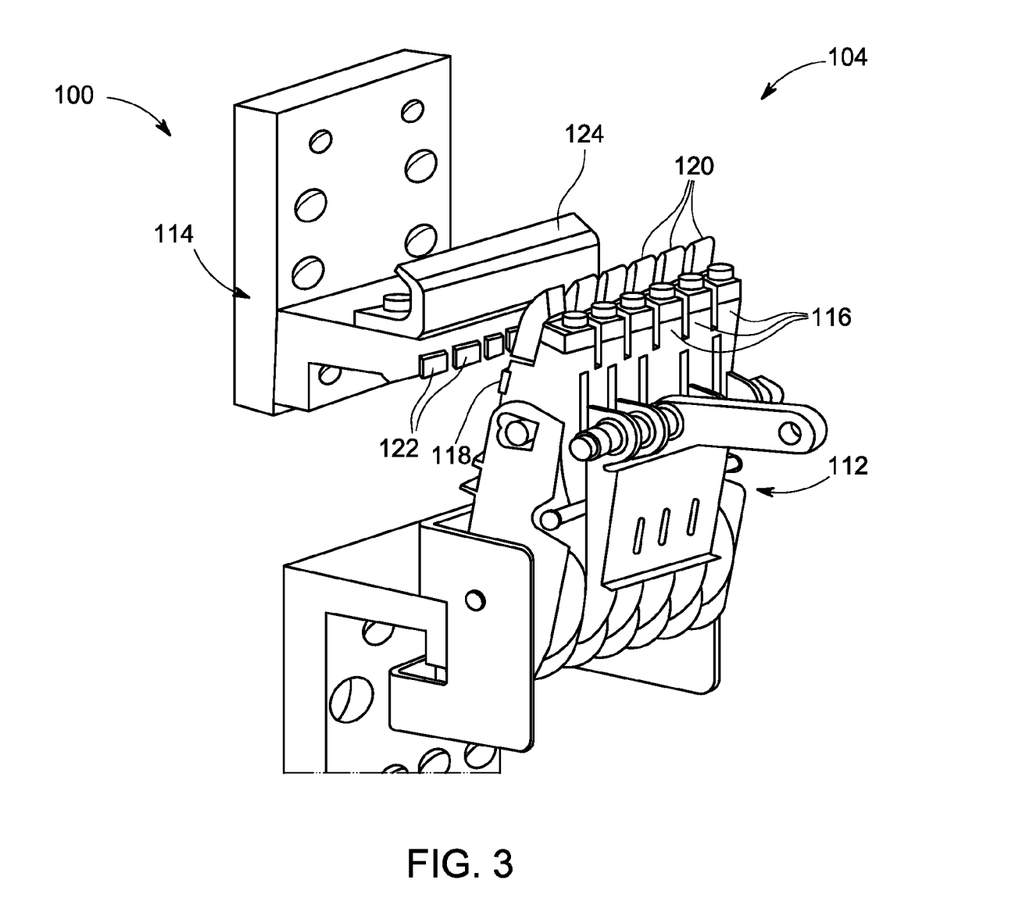
FIG. 3 is a perspective view of an exemplary contact assembly that may be used in the ATS panel shown in FIG. 2.

FIG. 3 is a perspective view of an upper contact assembly 104 of the plurality of contact assemblies (shown in FIG. 2) that may be used in ATS panel 100. In the exemplary embodiment, each upper contact assembly 104 includes a moveable contact assembly 112 and a stationary contact assembly 114. Moveable contact assembly 112 includes a plurality of individual contact fingers 116 that each include a moveable contact pad 118 and a movable arc horn 120. Stationary contact assembly 114 includes a plurality of stationary contact pads 122 and at least one stationary arc horn 124. In the exemplary embodiment, stationary contact pads 122 are in contact with moveable contact pads 118 when it is desired that ATS 12 (shown in FIG. 1) provide electrical power to load 18 (shown in FIG. 1).

However, when it becomes necessary to interrupt the circuit, moveable contact assembly 112 is moved away from stationary contact assembly 114, thus removing moveable contact pads 118 from physical contact with stationary contact pads 122 and creating a space therebetween. This may result in the formation of an electrical arc (not shown in FIG. 3) beginning at the time contact pads 118 and 122 are separated. As moveable contact assembly 112 moves away from stationary contact assembly 114, the electrical arc generally moves upwards, or downwards in the case of lower contact assembly 106 (shown in FIG. 2), to stretch between arc horns 120 and 124. The arc must be cooled, or quenched, as quickly as possible to terminate the pathway for current to flow through ATS 12 to load 18 via contact assemblies 112 and 114 when it is desired that load 18 be isolated from such current. Additionally, if the electrical arc is allowed to extend between contact pads 118 and 122 then vaporization or sublimation of the contact pad material itself may occur.

Figure 4:
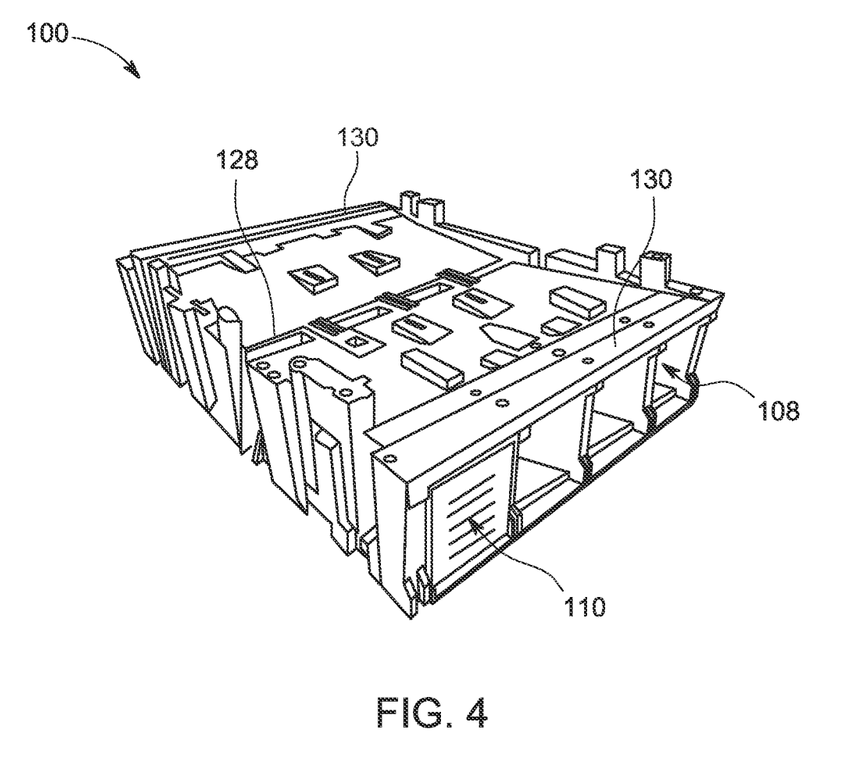
FIG. 4 is a perspective view of the ATS panel shown in FIG. 2 illustrating a cover assembly.

FIG. 4 is a perspective view of ATS panel 100 including a cover assembly 126. Arc chutes 110 are a serviceable component of ATS 12 (shown in FIG. 1) that are often replaced after erosion or corrosion. At least some known transfer switches include bussing that makes removal of the arc chutes from the top of the ATS panel undesirable. As such, the embodiments described herein allow for front removal for service and maintenance. More specifically, in the exemplary embodiment, cover assembly 126 includes a primary cover 128 configured to cover upper and lower contact assemblies 104 and 106 (shown in FIG. 2) and at least one secondary cover 130 configured to cover arc chutes 110 that are associated with one of upper or lower contact assemblies 104 or 106. Alternatively, ATS panel 100 may include two secondary covers 130 such that arc chutes 110 associated with upper contact assemblies 104 and arc chutes 110 associated with lower contact assemblies 106 are covered by separate secondary covers 130. Primary cover 128 is larger than secondary cover 130 and does not require removal to service or replace arc chutes 110.

Removal of secondary cover 130 allows a user to lift an arc chute 110 up such that chute 110 is partially out of its respective opening 108 and clear of primary cover 128, and then tilt the chute 110 to fully remove arc chute 110 from the front of ATS panel 100. Alternatively, the bussing may be oriented with ATS 12 such that each arc chute 110 is top removable from ATS panel 100. In the exemplary embodiment, each secondary cover 130 is a single piece that is removed to provide access to any of the arc chutes 110 which it covers. Alternatively, each secondary cover 130 may be divided into as multiple segments such that each segment is associated with a single arc chute 110 to allow access to a specific arc chute 110 by only removing the segment of secondary cover 130 associated with that chute 110. Therefore, in one particular embodiment, arc chutes 110 may be installed into ATS panel 100 at any time due to its flexible assembly.

Figure 5:
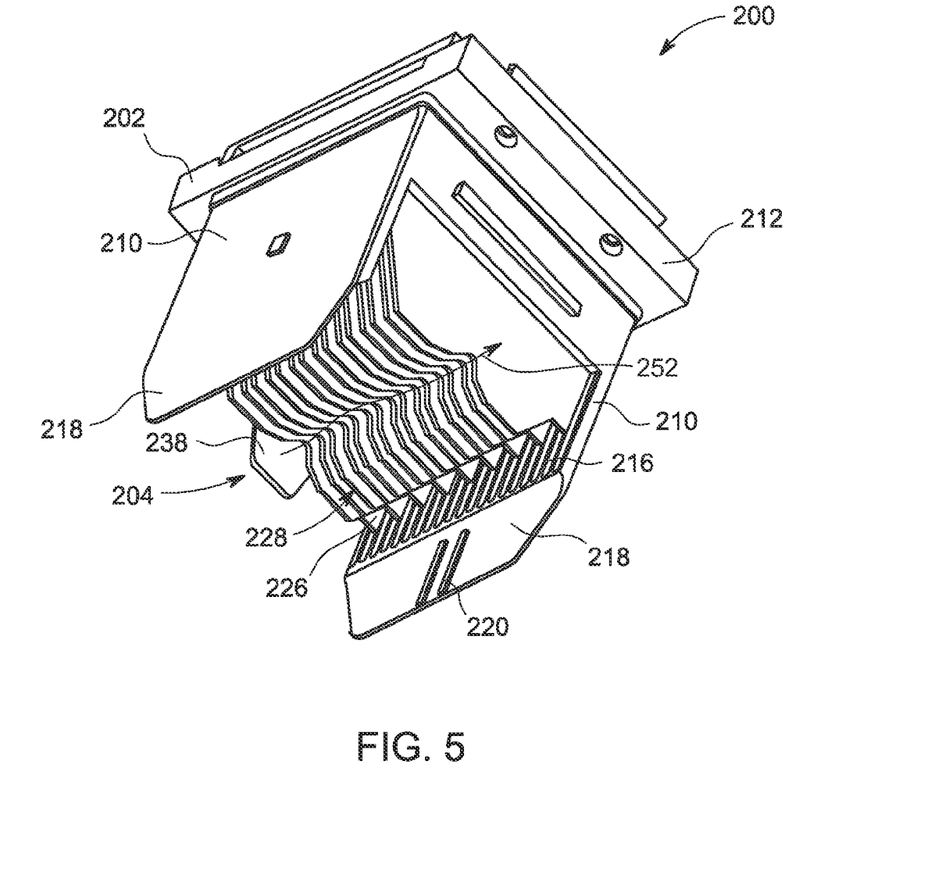
FIG. 5 is a perspective view of an exemplary arc chute that may be used in the ATS panel shown in FIG. 2.
Figure 6:
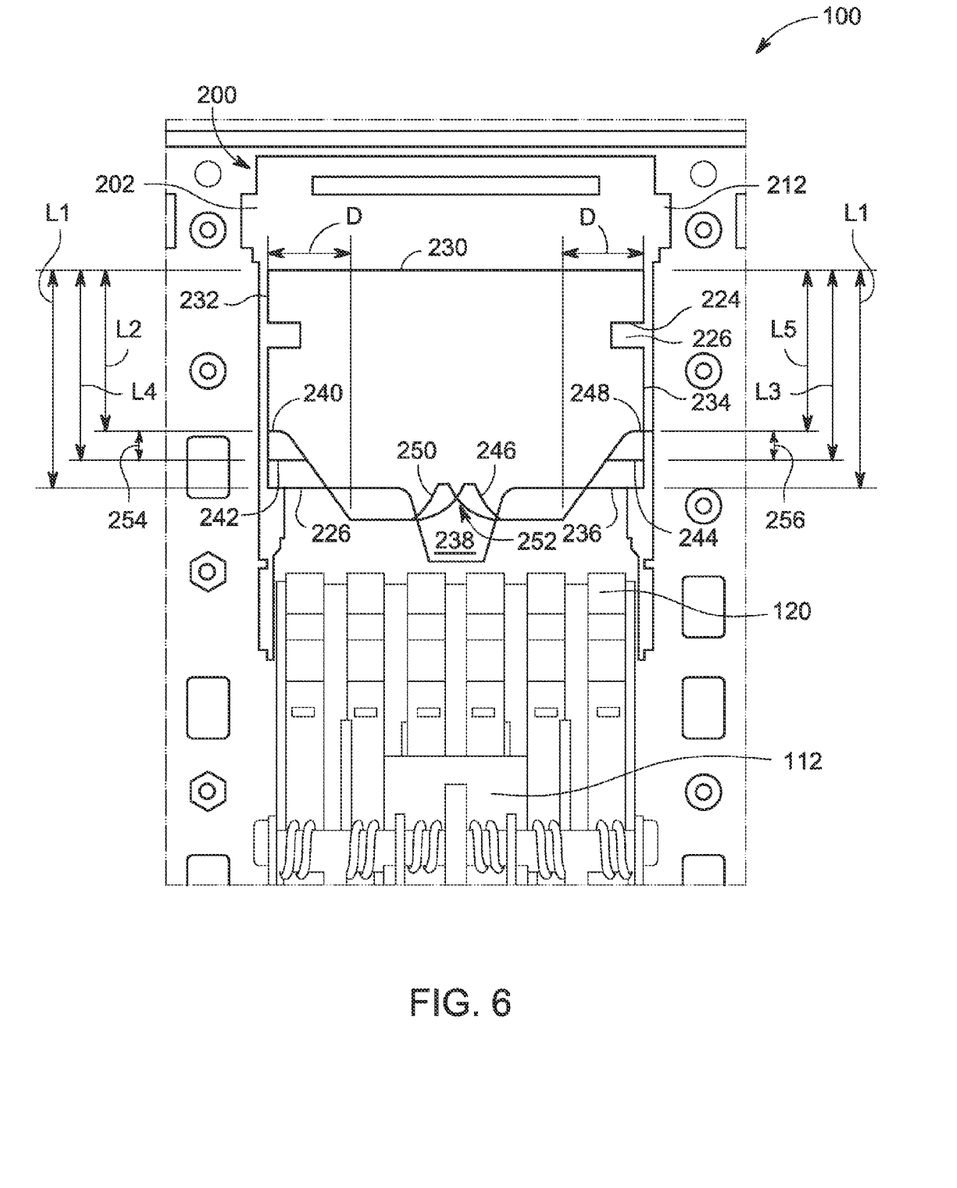
FIG. 6 is a front view of the exemplary arc chute mounted proximate a contact assembly within the ATS panel shown in FIG. 2.
Figure 7:
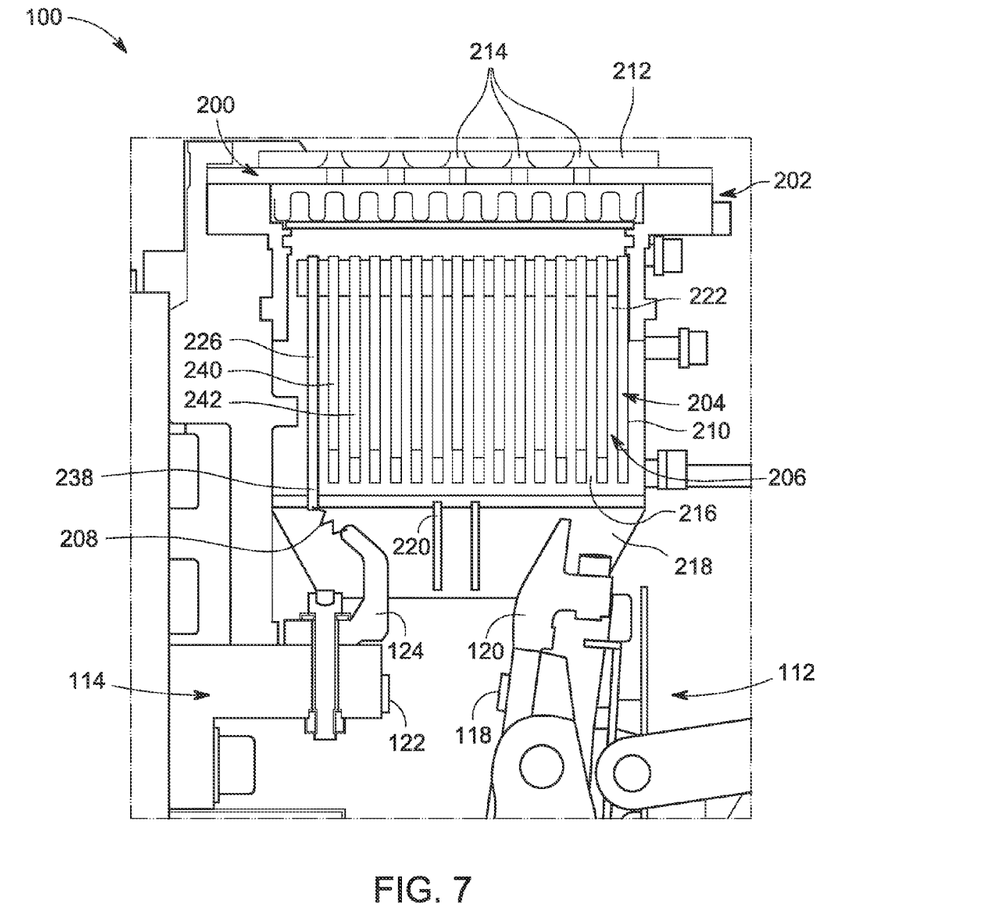
FIG. 7 is a cross-sectional side view of the exemplary arc chute mounted proximate a contact assembly within the ATS panel shown in FIG. 2.

FIG. 5 is a perspective view of an arc chute assembly 200 that may be used with upper and lower contact assemblies 104 and 106 in ATS panel 100 (all shown in FIG. 2). FIG. 6 is a front view of arc chute assembly 200 mounted proximate moveable contact assembly 112 of upper contact assembly 104 within ATS panel 100. FIG. 7 is a cross-sectional side view of arc chute 200 mounted proximate upper contact assembly 104 illustrating both movable and stationary contact assemblies 112 and 114 within ATS panel 100.

In the exemplary embodiment, arc chute assembly 200 includes a housing 202 and a plurality of deionization plates 204 that are positioned in a stacked configuration through housing 202 such that an axial air gap 206 is defined between adjacent plates 204. When movable contact assembly 112 is disconnected from stationary contact assembly 114, the air between assemblies 112 and 114 becomes highly ionized and an arc 208 is formed between separating contact pads 118 and 122. Arc 208 then travels toward arc chute assembly 200 and stretches between arc horns 120 and 124 before magnetically leaping to one of the plurality of deionization plates 204. Arc 208 is then stretched along plurality of deionization plates 204, giving the effect of a large number of short arcs in series, such that each short arc is substantially instantly deionizationized when the current drops to zero, and arc 208 is extinguished, or quenched. Current flow between assemblies 112 and 114 is not broken until arc 208 is extinguished. As described in further detail below, the combination of deionization plates 204 and arc horns 120 and 124 protect contact pads 118 and 122 and plastic housing 202 from arcing damage when ATS 12 switches between an open state and a closed state.

In the exemplary embodiment, housing 202 includes a pair of opposing sidewalls 210 spaced apart by a top wall 212. Top wall 212 includes a plurality of venting slots 214 configured to facilitate the movement of gases generated by arc 208 that may develop during ATS 12 operation. Venting slots 214 are defined by a plurality of elongated spaces in top wall 212 of housing 202, thereby facilitating arc gas movement up through deionization plates 204 and outwardly from ATS panel 100. Venting slots 214 include an angled profile, as best shown in FIG. 7, to act as a nozzle thereby more readily facilitating the escape of arc gases.

Each sidewall 210 of housing 202 includes a plurality of support members 216 and an extension flange 218 extending from support members 216 away from top wall 212. In the exemplary embodiment, deionization plates 204 are positioned within housing 202 and dimensioned to fit into support members 216, which are configured to retain the plurality of deionization plates 204 in a lateral arrangement that extends along sidewalls 210. Flange 218 is configured to protect adjacent ATS panel 100 components from corrosion, pitting and breakdown during arcing. In the exemplary embodiment, each flange 218 includes tapered ends that facilitate easier installation and removal and at least one rib portion 220 that is configured to increase over surface dielectric capacity due to increased over surface distance.

As best shown in FIGS. 6 and 7, each sidewall 210 also includes a projection 222 configured to engage a mounting slot 224 formed in each of the plurality of deionization plates 204 such that the plurality of deionization plates 204 are laterally spaced through housing 202. Mounting slots 224 and projection 222 are generally rectangular in cross section, although mounting slots 224 and projection 222 may have any cross-sectional shape that facilitates operation of arc chute assembly 200 as described herein. In the exemplary embodiment, projection 222 and mounting slots 224 are positioned proximate top wall 212 such that deionization plates 204 are coupled within housing 202 at a location removed a distance away from the location of arc 208 to ensure against projection 222 deterioration due to arcing. This improves the electrical switching life of arc chute assembly 200 at rated currents.

In the exemplary embodiment, the plurality of deionization plates 204 includes a primary plate 226 and a plurality of secondary plates 228. Each of primary plate 226 and the plurality of secondary plates 228 include a top edge 230, a first side 232, and an opposing second side 234. In the exemplary embodiment, top edge 230 of primary plate 226 is aligned with top edges 230 of secondary plates 228. Similarly, first and second sides 232 and 234 of primary plate 226 is aligned with first and second sides 232 and 234, respectively, of secondary plates 228.

Primary plate 226 further includes a bottom edge 236, as best shown in FIG. 6, which is substantially parallel to top edge 230. Bottom edge 236 is spaced a distance from top edge 230 such that both first and second sides 232 and 234 of primary plate 226 include a substantially similar length $L_1$. In the exemplary embodiment, bottom edge 236 includes a tongue portion 238 positioned substantially midway between first and second sides 232 and 234. Tongue portion 238 includes a trapezoidal shape extending from bottom edge 236 such that the base of tongue portion 238 is wider than the tip. Alternatively, tongue portion 238 may have any shape that facilitates operation of arc chute assembly 200 as described herein. In the exemplary embodiment, tongue portion 238 is approximately one third the length of length $L_1$ between top edge 230 and bottom edge 236. Alternatively, tongue portion 238 may be in the range of between approximately one-quarter to approximately one-half the length of length $L_1$. Generally, tongue portion 238 may extend any distance from bottom edge to facilitate operation of arc chute assembly 200 as described herein.

In the exemplary embodiment, tongue portion 238 is oriented in close proximity to stationary arc horn 124 such that, as arc horns 120 and 124 continue to separate, arc 208 is attracted to tongue portion 238. More specifically, the distance between the tip of tongue portion 238 and the tip of arc horn 124 is approximately half the length of tongue portion 238. Alternatively, the tip of tongue portion 238 may be any distance from the tip of arc horn 124 to facilitate operation of arc chute assembly 200 as described herein. Because electric arcs, such as arc 208, generally avoid leaping over large air gaps, positioning tongue portion 238 closest to stationary arc horn 124, compared to secondary plates 228, facilitates guiding arc 208 toward tongue portion 238 and away from housing sidewalls 210 to prevent degradation of housing 202 material. Guiding arc 208 towards the middle of primary plate 226 facilitates maintaining the integrity of housing 202.

In the exemplary embodiment, the plurality of secondary plates 228 includes at least a first secondary plate 240 and a second secondary plate 242. First secondary plate 240 is positioned adjacent primary plate 226 and second secondary plate 242 is positioned adjacent first secondary plate 240 such that first secondary plate 240 is between second secondary plate 242 and primary plate 226. First and second secondary plates 240 and 242 are coupled within housing 202 in a repeating alternating pattern along sidewalls 210 until each support member 216 includes a secondary plate 228, as described in further detail below.

First secondary plate 240 includes a bottom edge 244 that includes a notch 246 that is positioned substantially midway between first and second sides 232 and 234 and that is tilted towards second side 234. Similarly, second secondary plate 240 includes a bottom edge 248 that includes a notch 250 that is positioned substantially midway between first and second sides 232 and 234. However, notch 250 is tilted towards first side 232. In the exemplary embodiment, notches 246 and 250 of the plurality of secondary plates 228 combine to define an arc channel 252 that is configured to capture arc 208 from tongue portion 238 of primary plate 226 and guide arc 208 through arc chute assembly 200 to facilitate arc 208 quenching. Such a configuration of deionization plates 204 and notches 246 and 250 with respect thereto provides for optimal quenching of electrical arc 208 by giving effective magnetic pull to arc chute assembly 200 such that arcs 208 having across various fault levels and system voltages are able to be extinguished.

Furthermore, bottom edge 244 of first secondary plate 240 is spaced a distance from top edge 230 such that first side 232 of first secondary plate 240 includes a length $L_2$ and second side 232 of first secondary plate 240 includes a length $L_3$ that is longer than length $L_2$. Similarly, bottom edge 248 of second secondary plate 242 is spaced a distance from top edge 230 such that first side 232 of second secondary plate 242 includes a length $L_4$ and second side 232 of second secondary plate 242 includes a length $L_5$ that is shorter than length $L_4$. Furthermore, length $L_2$ is substantially equal to length $L_5$ and length $L_3$ is substantially equal to length $L_4$. As such, first sides 232 of first and second secondary plates 240 and 242 are staggered with respect to each other such that a vertical air gap 254 is defined therebetween in addition to axial gap 206. Similarly, second sides 234 of first and second secondary plates 240 and 242 are staggered with respect to each other such that a vertical air gap 256 is defined therebetween in addition to axial gap 206. In the exemplary embodiment, first and second secondary plates 240 and 242 are substantially similar to each other with second secondary plate 242 simply being oriented 180 degrees with respect to first secondary plate 240. Alternatively, first and second secondary plates 240 and 242 may be separate and distinct plates.

In the exemplary embodiment, referring to first secondary plate 240, bottom edge 244 extends obliquely a distance D towards tongue portion 238 from first and second sides 232 and 234 such that bottom edge 244 is spaced distance D from sidewalls 210 and is in close proximity of arc horns 120 and 122 between first and second sides 232 and 234. More specifically, bottom edge 244 extends towards arc horns 120 and 122 between first and second sides 232 and 234 such that length $L_2$ of first side 232 is the minimum distance bottom edge 244 extends from top edge 230. Similarly, referring now to second secondary plate 242, bottom edge 248 extends obliquely distance D towards tongue portion 238 from first and second sides 232 and 234 such that bottom edge 248 is spaced distance D from sidewalls 210 and is in close proximity of arc horns 120 and 122 between first and second sides 232 and 234. More specifically, bottom edge 248 extends towards arc horns 120 and 122 between first and second sides 232 and 234 such that length $L_5$ of second side 234 is the minimum distance bottom edge 248 extends from top edge 230. As such, bottom edges 244 and 248 are closer in proximity to arc horns 120 and 124 over a central portion of secondary plates 240 and 242 than bottom edges 244 and 248 are to sidewalls 210 over substantially the same central portion.

In operation, as arc horns 120 and 124 separate, arc 208 leaps to tongue portion 238 of primary plate 226. More specifically, as mentioned above, it is known that electrical arcs are generally attracted to the conductive material that is closest in proximity to allow the arc to maintain voltage, and as such, generally avoid jumping large air gaps. Since tongue portion 238 is located closer to arc horn 120, the origin of arc 208, than any other conductive material, arc 208 transfers to tongue portion 238. As such, arc 208 initially jumps to tongue portion 238, and subsequently propagates through arc channel 252 of alternating first and second secondary plates 240 and 242 until arc 208 is stretched along the length of arc channel 252 and extinguished.

In the exemplary embodiment, vertical air gap 254, defined by the difference in length $L_4$ and length $L_2$ of staggered first sides 232, and vertical air gap 256, defined by the difference in length $L_3$ and length $L_5$ of staggered second sides 234, facilitate limiting arc 208 to arc channel 252. As such, arc 208 is restricted from moving up bottom edges 244 and 248 toward sidewalls 210 because of gaps 254 and 256. Maintaining arc 208 within arc channel 252 facilitates maintain the integrity of housing sidewalls 210 because sidewalls 210 are less likely to be subjected to an arcing event.

One embodiment of the present invention describes an arc chute assembly including a housing and a plurality of laterally-spaced deionization plates coupled within the housing. A primary plate includes a tongue portion that extends toward a contact assembly and is configured to receive an electrical arc. A plurality of secondary plates include a first plate and a second plate that are alternately coupled within housing and that each include a notched portion to define an arc channel configured to mitigate the electrical arc through the arc chute assembly. Opposing sides of the first plate and of the second plate are different lengths such that both a vertical and an axial gap are defined between the first and second plates to prevent the arc from contacting the housing. The embodiments described herein describe an easily serviceable modular design that provides improved arc quenching capability and a longer serviceable life span of the arc chute assembly for interruption of rated current.

Exemplary embodiments of an automatic transfer switch having an arc chute assembly are described herein. The arc chute assembly includes a housing and a plurality of laterally-spaced deionization plates coupled within the housing. A primary plate includes a tongue portion that extends toward a contact assembly and is configured to receive an electrical arc. A plurality of secondary plates include a first plate and a second plate that are alternately coupled within housing and that each include a central portion positioned in close proximity to the contact assembly. The central portions of each of the first and second plates include a notched portion to define an arc channel that is configured to mitigate the electrical arc through the arc chute assembly. Opposing sides of the first plate and of the second plate are different lengths such that both a vertical and an axial gap are defined between the first and second plates to prevent the arc from contacting the housing. The embodiments described herein describe an easily serviceable modular design that provides improved arc quenching capability and a longer serviceable life span of the arc chute assembly for interruption of rated current.

Exemplary embodiments of an arc chute assembly and methods for assembling the same are described above in detail. The methods and assemblies are not limited to the specific embodiments described herein, but rather, components of assemblies and/or steps of the methods may be utilized independently and separately from other components and/or steps described herein. For example, the methods may also be used in combination with other automatic transfer switch systems, and are not limited to practice with only the automatic transfer switch system as described herein. Rather, the exemplary embodiment can be implemented and utilized in connection with many other automatic transfer switch systems.

Although specific features of various embodiments of the invention may be shown in some drawings and not in others, this is for convenience only. In accordance with the principles of the invention, any feature of a drawing may be referenced and/or claimed in combination with any feature of any other drawing. Further, although words such as "top" and "bottom" are used throughout the specification, there is no absolute orientation in the universe and such terms are used merely to aid the reader and are not meant to be limiting in nature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An arc chute assembly for use in an automatic transfer switch having a contact assembly, said arc chute assembly comprising:
   a housing comprising a pair of opposing sidewalls including a first sidewall and a second sidewall;
   a primary deionization plate coupled between said pair of opposing sidewalls, said primary deionization plate comprising a tongue portion oriented substantially midway between said opposing sidewalls and extending in a first direction toward the contact assembly, said tongue portion configured to facilitate suppressing an electric arc originating from the contact assembly, wherein said primary deionization plate includes a pair of sides having a primary plate length extending along said pair of opposing sidewalls; and
   a plurality of secondary deionization plates coupled between said pair of opposing sidewalls, said plurality of secondary deionization plates comprising at least a first plate and a second plate, wherein said first plate includes a first side having a first length extending along said first sidewall and an opposing second side having a second length extending along said second sidewall that is longer than the first length, said first plate further includes a bottom edge comprising at least one oblique portion, wherein said oblique portion extends obliquely away from one of said first sidewall and said second sidewall to define an air gap between said oblique portion and said one of said first sidewall and said second sidewall, and wherein the primary deionization plate length is longer than each of the first length and the second length.

2. The arc chute assembly in accordance with claim 1, wherein said first and second plates are coupled in a repeating alternating pattern along said sidewalls.

3. The arc chute assembly in accordance with claim 1, wherein said second plate includes a first side aligned with said first side of said first plate and a second side aligned with said second side of said first plate, said first side of said second plate having a third length extending along said first sidewall and a second side of said second plate having a fourth length extending along said second sidewall that is shorter than the third length.

4. The arc chute assembly in accordance with claim 3, wherein the first length is substantially equal to the third length, and the second length is substantially equal to the fourth length.

5. The arc chute assembly in accordance with claim 1, wherein said bottom edge extends obliquely in the first direction toward said tongue portion from both said first and said second sides.

6. The arc chute assembly in accordance with claim 1, wherein said second plate includes a bottom edge that extends obliquely in the first direction toward said tongue portion from both said first and said second sides.

7. An automatic transfer switch comprising:
   at least one ATS panel comprising a plurality of contact assemblies and a plurality of arc chute assemblies, a respective one of said contact assemblies coupled to a respective one of said arc chute assemblies, each of said arc chute assemblies comprising:
      a housing comprising a pair of opposing sidewalls including a first sidewall and a second sidewall;
      a primary deionization plate coupled between said pair of opposing sidewalls, said primary deionization plate comprising a tongue portion oriented substantially midway between said opposing sidewalls and extending in a first direction toward one of said plurality of contact assemblies, said tongue portion configured to facilitate suppressing an electric arc originating from said contact assembly, wherein said primary deionization plate includes a pair of sides having a primary plate length extending along said pair of opposing sidewalls; and
      a plurality of secondary deionization plates coupled between said pair of opposing sidewalls, said plurality of secondary deionization plates comprising at least a first plate and a second plate, wherein said first plate includes a first side having a first length extending along said first sidewall and an opposing second side having a second length extending along said second sidewall that is longer than the first length, said first plate further includes a bottom edge comprising at least one oblique portion, wherein said oblique portion extends obliquely away from one of said first sidewall and said second sidewall to define an air gap between said oblique portion and said one of said first sidewall and said second sidewall, and wherein the primary deionization plate length is longer than each of the first length and the second length.

8. The automatic transfer switch in accordance to claim 7 further comprising a removable cover assembly configured to cover said contact bank, said cover assembly comprising a primary cover configured to cover said plurality of contact assemblies and at least one secondary cover configured to cover at least one of said arc chute assemblies.

9. The automatic transfer switch in accordance to claim 7, wherein said bottom edge extends obliquely in the first direction toward said tongue portion from both said first and said second sides.

10. The automatic transfer switch in accordance to claim 7, wherein said second plate includes a bottom edge that extends obliquely in the first direction toward said tongue portion from both said first and said second sides.

11. The automatic transfer switch in accordance to claim 8, wherein removal of said secondary cover facilitates removal of at least one of said arc chute assemblies from at least one of a front side and a top end of said contact bank.

12. The automatic transfer switch in accordance to claim 8, wherein said at least one secondary cover is configured to cover a plurality of said arc chute assemblies.

13. The automatic transfer switch in accordance to claim 8, wherein said at least one secondary cover is configured to cover a respective one of said plurality of arc chute assemblies.

14. The automatic transfer switch in accordance to claim 7, wherein said first and second plates are coupled in a repeating alternating pattern along said sidewalls.

15. The automatic transfer switch in accordance to claim 7, wherein said second plate includes a first side aligned with said first side of said first plate and a second side aligned with said second side of said first plate, said first side of said second plate having a third length extending along said first sidewall and a second side of said second plate having a fourth length extending along said second sidewall that is shorter than the third length.

16. A method of assembling an automatic transfer switch including at least one ATS panel frame, said method comprising:
coupling a plurality of contact assemblies to the ATS panel frame;
coupling a respective arc chute assembly to the ATS panel frame proximate each of the plurality of contact assemblies, wherein coupling an arc chute assembly to the ATS panel frame further comprises:
coupling a housing to the ATS panel frame, the housing including a pair of opposing sidewalls including a first sidewall and a second sidewall;
coupling a primary deionization plate between the pair of opposing sidewalls, the primary deionization plate including a tongue portion oriented substantially midway between the opposing sidewalls and extending in a first direction toward the contact assembly, wherein the tongue portion is configured to facilitate suppressing an electric arc originating from the contact assembly, wherein said primary deionization plate includes a pair of sides having a primary plate length extending along said pair of opposing sidewalls; and
coupling a plurality of secondary deionization plates between the pair of opposing sidewalls, the plurality of secondary deionization plates including at least a first plate and a second plate, wherein the first plate includes a first side having a first length extending along the first sidewall and an opposing second side having a second length extending along the second sidewall that is longer than the first length, the first plate further includes a bottom edge including at least one oblique portion, wherein the oblique portion extends obliquely away from one of the first sidewall and the second sidewall to define an air gap between the oblique portion and the one of the first sidewall and the second sidewall, and wherein the primary deionization plate length is longer than each of the first length and the second length.

17. The method in accordance with claim 16, wherein coupling a plurality of secondary deionization plates comprises coupling the first plate and the second plate in a repeating alternating pattern between the pair of opposing sidewalls.

18. The method in accordance with claim 16, wherein coupling a plurality of secondary deionization plates further comprises coupling second plate including a first side aligned with the first side of the first plate and a second side aligned with the second side of the first plate, wherein the first side of the second plate includes a third length extending along the first sidewall and a second side of the second plate includes a fourth length extending along said second sidewall that is shorter than the third length.

19. The method in accordance with claim 16 further comprising coupling a removable cover assembly to the ATS panel frame, the cover assembly including a primary cover configured to cover the plurality of contact assemblies and at least one secondary cover configured to cover at least one arc chute assembly.

* * * * *